United States Patent
Rolia et al.

(10) Patent No.: US 7,188,174 B2
(45) Date of Patent: Mar. 6, 2007

(54) ADMISSION CONTROL FOR APPLICATIONS IN RESOURCE UTILITY ENVIRONMENTS

(75) Inventors: Jerome Alexander Rolia, Kanata (CA); Xiaoyun Zhu, San Jose, CA (US); Martin Fraser Arlitt, Calgary (CA); Artur Andrzejak, Berlin (DE)

(73) Assignee: Hewlett-Packard Development Company, L.P., Houston, TX (US)

( * ) Notice: Subject to any disclaimer, the term of this patent is extended or adjusted under 35 U.S.C. 154(b) by 774 days.

(21) Appl. No.: 10/330,312

(22) Filed: Dec. 30, 2002

(65) Prior Publication Data

US 2004/0128384 A1 Jul. 1, 2004

(51) Int. Cl.
*G06F 15/173* (2006.01)

(52) U.S. Cl. ............ 709/226; 709/220; 709/223; 709/226; 370/320; 718/100

(58) Field of Classification Search .......... 709/220, 709/223, 226; 370/320; 718/100
See application file for complete search history.

(56) References Cited

U.S. PATENT DOCUMENTS 6,463,454 B1 * 10/2002 Lumelsky et al. .......... 718/105
6,498,786 B1 * 12/2002 Kirkby et al. ............. 370/322
6,658,512 B1 * 12/2003 Gokulrangan ............. 710/117

2003/0096610 A1 * 5/2003 Courtney et al. .......... 455/429
2004/0005041 A1 * 1/2004 Zahir Azami .......... 379/112.06

OTHER PUBLICATIONS

Nick Kingsbury, Probability Distributions.*
Michael Hagg, Random Processes: Mean and Variance.*
Harrick M. Vin, Paw an Goyal, Alok Goyal and Anshuman Goyal; A Statistical Admission Control Algorithm for Multimedia Servers; Oct. 1994, Department of Computer Science, University of Tetxas at Austin.
Dongxu Shen, Joseph L. Hellerstein; Predictive Models for Proactive Network Management: Application to a Production Web Server; Apr. 2000.
Jeffrey S. Chase, Darrell C. Anderson, Prachi N. Thakar, Amin M. Vahdat; Managing Energy and Server Resources in Hosting Centers; Oct. 2001, Department of Computer Science, Duke University.
Jerry Rolia, Xiaoyun Zhu, Martin Arlitt, and Artur Andrzejak; Statistical Service Assurances for Applications in Utility Grid Environments; Jun. 2002 Internet System and Storage Laboratory, Hewlett Packard Laboratories.
Jerry Rolia, Xiaoyun Zhu, and Martin Arlitt; Resource Access Management for a Utility Hosting Enterprise Applications; Jan. 2003, Hewett-Packard Laboratories.

* cited by examiner

*Primary Examiner*—Saleh Najjar
*Assistant Examiner*—Thuong (Tina) T. Nguyen
(74) *Attorney, Agent, or Firm*—Richard P. Lange

(57) ABSTRACT

A system and method to provide admission control of resources for applications in resource utility environments. Admission control is used to efficiently allocate access to resources with a certain level of assurance based on statistical behavior of resource demands of applications.

24 Claims, 5 Drawing Sheets

| NUMBER OF SERVERS NEEDED (BETWEEN 9-10 AM) | PROBABILITY |
|---|---|
| 1<br>2<br>3<br>4<br>5 | 0.10<br>0.15<br>0.20<br>0.40<br>0.15 |
| | 1.00 |

100-B

ADMISSION CONTROL FOR APPLICATIONS IN RESOURCE UTILITY ENVIRONMENTS

FIELD OF THE INVENTION

This invention relates generally to programmatic access to information technology ("IT") resources. In particular, the invention relates generally to admission control of applications in resource utility environments.

BACKGROUND OF THE INVENTION

Grid environments offer programmatic access to information technology (IT) resources for applications. These environments have emerged to support the needs of the engineering and scientific communities. For example grid environments may harness the unused compute capacity of engineering workstations within an organization or provide access to specialized resources such as supercomputer clusters that are shared by many scientific researchers. These grid environments provide languages to specify resources required by jobs and services for brokering, resource discovery and resource management.

To date, grid environments have focused on support for scientific and engineering jobs. There is substantial literature regarding admission control, resource reservation, and scheduling for the support of these kinds of jobs for grids. Jobs are typically given a start-time/end-time window and a maximum job duration within the window. Peak requirements for resources such as CPUs, memory, network bandwidth, and storage capacity are identified and reserved for the duration of the job. This has proven to be effective for the batch job type of applications typically associated with engineering and science workloads.

In addition to scientific and engineering applications, there are also business applications. A business application may be loosely defined as an application requiring resources on a continuous basis but with resource requirements that vary based on factors such as time of day and day of week. In the same way as scientific applications acquire resources from computing grids, business applications may rely on resource utilities. Resource utilities are typically tightly coupled resources, which are realized as data centers and offer IT infrastructure as a service on demand.

The grid currently provides infrastructure for the support of batch jobs in resource utility environments. A job description is submitted to a resource manager. The resource manager uses resource availability information to decide whether it has sufficient resources to support the job. Current grid technologies rely on resource management systems such as Load Sharing Facility ("LSF") by Platform Computing of Canada. Advance reservation may be appropriate for jobs that require access to large numbers of resources or require access to popular resources that are difficult to obtain. With advance reservation, time is partitioned into slots and slots form a calendar. Reservations typically begin in the first available slot where all required resources are available.

As noted above, jobs are described in part by their peak resource requirements and maximum job duration. In other words, with advance reservation, the jobs are guaranteed access with enough resources to meet the peak requirement for the application. However, for business applications, the peak number of resources demanded and the mean number of resources demanded by the application may differ greatly (e.g., by a factor up to 20 and greater). Thus, the resources may be significantly under-utilized because much of the resources that are reserved are idle for a significant portion of the reserved duration of time. Therefore, with conventional advance reservation systems, resource utilization may be relatively inefficient.

SUMMARY OF THE INVENTION

According to an embodiment of the present invention, a method of admission control for an application in a resource utility environment may include determining the application's statistical demand profile for resources required by the application; determining an assurance level of the resource utility; and admitting the application based on the statistical demand profile of the application, the assurance level of the resource utility, and statistical demand profiles of one or more applications currently hosted by the resource utility.

According to another embodiment of the present invention, an admission control system for admitting an application in a resource utility environment may include a statistical demand profiler configured to determine statistical demand profiles of the application; and an admission controller configured to admit the application based on the statistical demand profile of the application, an assurance level of the resource utility, and statistical demand profiles of one or more applications currently hosted by the resource utility.

According to yet another embodiment of the present invention, a computer readable medium on which is embedded computer software comprising a set of instructions for a method of admission control for an application in a resource utility environment, the instructions may include a method for determining the application's statistical demand profile for resources required by the application; determining an assurance level for the resource utility; and admitting the application based on the statistical demand profile of the application, the assurance level of the resource utility, and statistical demand profiles of one or more applications currently hosted by the resource utility.

BRIEF DESCRIPTION OF THE DRAWINGS

Features of the present invention will become apparent to those skilled in the art from the following description with reference to the drawings, in which.

DETAILED DESCRIPTION

Figure 1A:
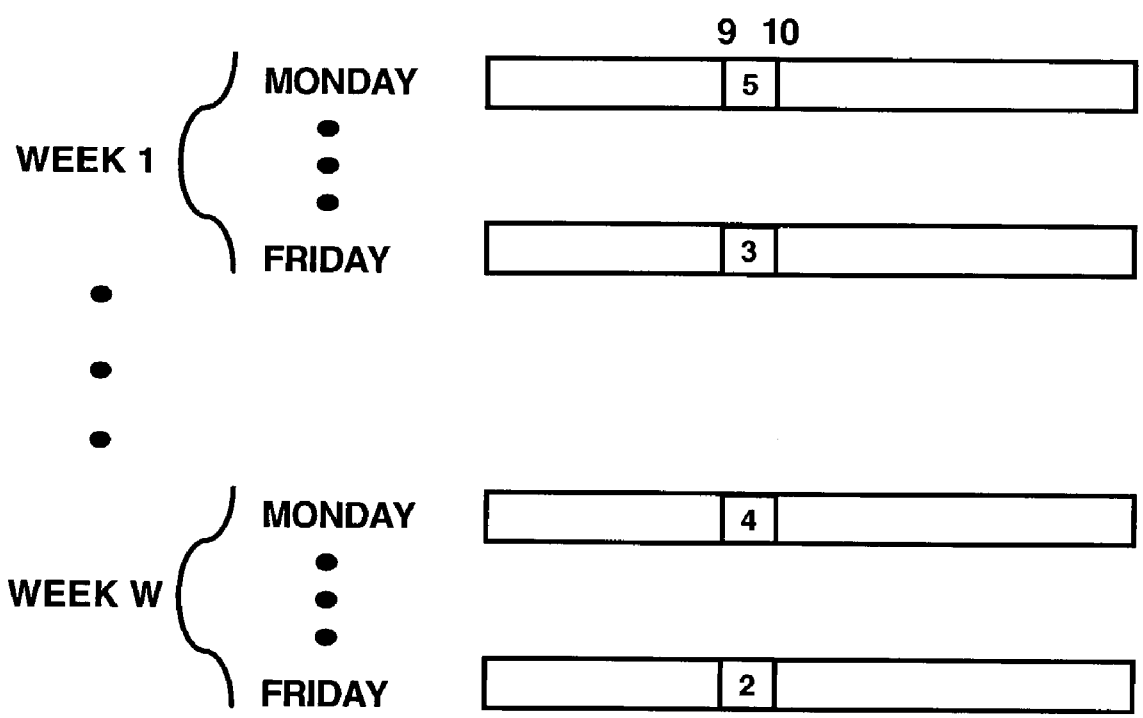
FIGS. 1A–1C are diagrams illustrating a construction of an exemplary probability mass function according to an embodiment of the present invention.

For simplicity and illustrative purposes, the principles of the present invention are described by referring mainly to exemplary embodiments thereof. However, it is to be understood that the same principles are equally applicable to many types of resource utility environments.

In an embodiment of the present invention, an admission control may be utilized to support scheduling of applications to be run in a resource utility environment. While batch type applications may be supported, additional benefits may be realized for scheduling business applications. As noted previously, a business application may be loosely defined as an application requiring resources on a continuous basis but with resource requirements that vary based on factors such as time of day and day of week. Typically, business applications may rely on resource utilities, which may be described as tightly coupled resources that are typically realized as data centers offering IT infrastructure as a service on demand. For example, HP's Utility Data Center is a product which can offer multi-tiered infrastructure on demand.

Statistical multiplexing may be used to provide statistical assurances regarding resource availability. An advantage of statistical multiplexing is that it allows more efficient utilization of resources as compared to the strict advance reservations based on peak demand and duration, while providing a measure of assurance that the application will have access to the needed resources. Historical and/or anticipated load information may be used to specify an application's expected resource requirements, which in turn provides the ability to use statistical multiplexing and provide statistical assurances regarding resource availability. In addition, the impact of correlation between applications may be considered.

As noted above, the peak amount of resources demanded and the mean amount of resources demanded by a business application may differ greatly (e.g., by a factor of 20 or greater). Resource utilities may be exploited for such applications by acquiring and releasing resources as needed based on current workload conditions. For such applications, workload patterns are often repeatable and the future workload conditions and corresponding resource demands may be known statistically.

Substantial differences between peak and mean resource requirements and a potentially variable numbers of users motivate the development of admission control mechanisms that exploit statistical multiplexing. In other words, there is an opportunity to overbook a resource utility's resources yet provide high statistical assurance, i.e., high probability, that resources will be made available to applications when they need them. In this manner, more applications may be supported with the same or fewer resources.

Here, overbooking a resource is measured relative to the peak resource requirements. For example, consider an environment with a total of five servers, and two applications, $a_1$ and $a_2$, which have peak server requirements of three and four, respectively. If both applications $a_1$ and $a_2$ are admitted to run simultaneously, then the sum of peak demands for servers from applications $a_1$ and $a_2$ is seven, which means that the server resource is overbooked by two.

However, the application $a_1$ may not need four servers for the entire duration and thus some of the servers may be released to be used by other applications such as $a_2$. Similarly, the application $a_2$ may not need three servers for the entire duration and the unused servers may be released. Through the use of statistical multiplexing, there is some assurance level $\theta$, for example 0.95, that requests for resources from both $a_1$ and $a_2$ will be satisfied. The assurance level $\theta$ may be viewed as a probability that a requested resource will be made available.

In an embodiment of the present invention, an approach for statistically characterizing the demand profiles of applications for the resource utility may be provided. In other words, statistical demand profiles ("SDP") for applications may be determined. Each SDP represents historical and/or anticipated resource requirements for that application. Suppose there is a particular type of resource used by an application. The application's corresponding required number of resources may be modeled as a sequence of random variables, $\{X_t, t=1, 2, 3, \ldots, T\}$, where t indicates a particular time slot, T indicates a total number of time slots used in the profile, and $X_t$ indicates the required number of resources of the particular type during each time slot t. For example, if each t corresponds to a 60 minute time slot, and T is 24, then this profile may represent resource requirements for each hour of the day. Note that the profile represents a pattern of behavior, which is repeatable. The time duration and the total number of slots may be varied as necessary.

Given sufficiently large number of observations from historical data, it can be generally assumed that the behavior of $X_t$ is predictable from a statistical perspective. This means that statistical inference may be used to predict how frequently a particular number of resources may be needed. A probability mass function (pmf) may be used to represent this information. Suppose $X_t$ may take any value from $\{1, 2, \ldots, m\}$ where m is the observed maximum of the required number of resources of the particular type. Then the pmf may be represented as a set of probabilities $\{p_k, k=1, 2, 3, \ldots m\}$, where $p_k = P_r[X_t = k]$. While the m and $p_k$ do not have the subscript t for simplicity, they are defined for each time slot. An SDP for an application may be composed of a set of sequences of pmfs where each sequence characterizes the resource requirement upon a particular type.

Figures 1B, 1C:
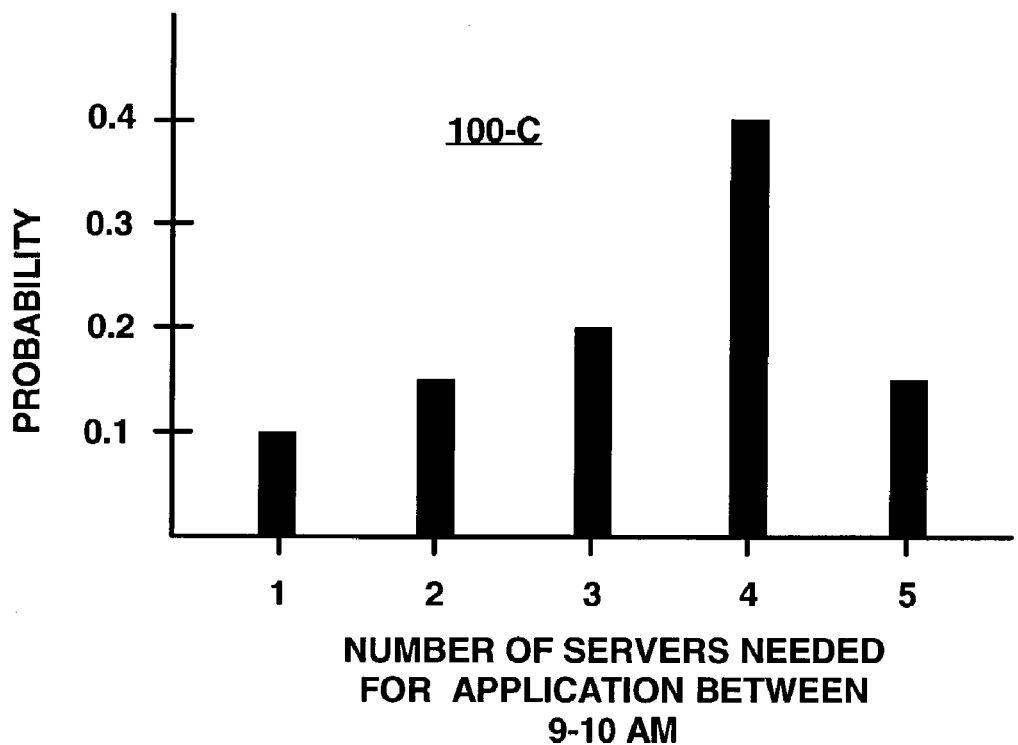

FIGS. 1A–1C are diagrams 100-A, 100-B, and 100-C, respectively, illustrating a construction of an exemplary pmf according to an embodiment of the present invention. In this example, for illustrative purposes, only weekdays are considered. More specifically, diagram 100-A of FIG. 1A shows the construction of a pmf for the 9–10 AM time slot for an SDP of an application. As shown, the application required between one and five servers over W weeks of observation. Since there are five observations per week there are a total of 5 W observations contributing to each application pmf. In this example, based on observations, the probability of the application requiring one server during the hour between 9 AM and 10 AM is 0.1 (10%), probability of requiring two servers is 0.15 (15%), and probabilities of requiring three, four, and five servers are 0.20, 0.40, and 0.15, respectively, as shown in diagrams 100-B and 100-C in FIGS. 1B and 1C.

One of the advantages of the pmf approach is that the approach does not rely on any a priori knowledge of the underlying distribution for $X_t$—the distribution may be directly estimated using a sample of independent observations. Also, the minimum and peak demands may be observed and the mean and variance may be easily computed from the observations. In addition, as will be described below, the pmfs of individual applications may be used to bound potential correlations between applications.

Note that observations actually provide estimations of the true pmfs. The pmfs in the SDP may be estimated in the following manner. Suppose $\{p_k, k=1, 2, 3, \ldots m\}$ is the "true" pmf for $X_t$. What is available is a sample of N observations of $X_t$. If $Z_k$ is a number of observations with a value of k, then $$\hat{p}_k = \frac{Z_k}{N}.$$

In other words, the true pmf $\{p_k, k=1, 2, 3, \ldots m\}$ is estimated by corresponding estimated pmf $\{\hat{p}_k, k=1, 2, 3, \ldots m\}$.

In making admission control decisions for resource utilities, aggregate demand for resources may be considered. SDPs of individual applications may be used to determine the aggregate demand, and thus to determine the amount of resources needed by the resource utility to support many applications with specific statistical assurance.

Assume that the resource utility has shared pools of resources allocated to support one or more applications. The aggregate demand for a particular resource type may be modeled a sequence of random variables, denoted as $\{Y_t, t=1, 2, 3, \ldots, T\}$, where t indicates a particular time slot, T indicates a total number of time slots used in the profile, and $Y_t$ indicates the required aggregate number of resources during each time slot t. Similar to an application's SDP, the utility profile may also include sequences of pmfs, with one sequence per resource type, that describe the statistical behavior of the resource utility's aggregate resource requirements.

In an embodiment of the present invention, individual application profiles may be used to populate time slots of a calendar for the resource utility, which in turn may be used to generate the utility profile. A calendar may be viewed as a potential schedule of resource demands over some time duration. For example, there can be a monthly calendar, a quarterly calendar, a half-year calendar, and the like.

It was discussed above that the individual SDPs of application may be used to populate a calendar. As an illustration, assume that a quarterly calendar (13 weeks) is being populated. Using the example embodied in FIGS. 1A–1C, it is noted that for this particular application, there is a statistical description of resource demand for each hourly slot of the work day including the 9–10 AM slot. In this instance, the SDP of this application may be added to each slot of the calendar, including the 9–10 AM slot, over the duration of the calendar. In this instance, each workday of the calendar will be populated with the SDP of the application. For example, the demand for the 9–10 AM slot of this application will be repeated 65 times 65 (13×5). SDPs of other applications may be added to the same time slot of the calendar as well. Note that the granularity of the calendar is not limited to one hour time slots. The times slots may be smaller or larger. The calendar may be used as a planning tool for admission control purposes.

Using the calendar, a determination may be made as to whether a particular application will be admitted or not. For example, if a desired assurance level θ cannot be met over the duration of the calendar by admitting an application, then the application may be rejected. In other words, whenever another application requires admittance, its SDP may be unrolled on to the calendar, its effect on the assurance level θ may be calculated, and the application may be admitted or rejected based on the calculated effect.

Figure 2:
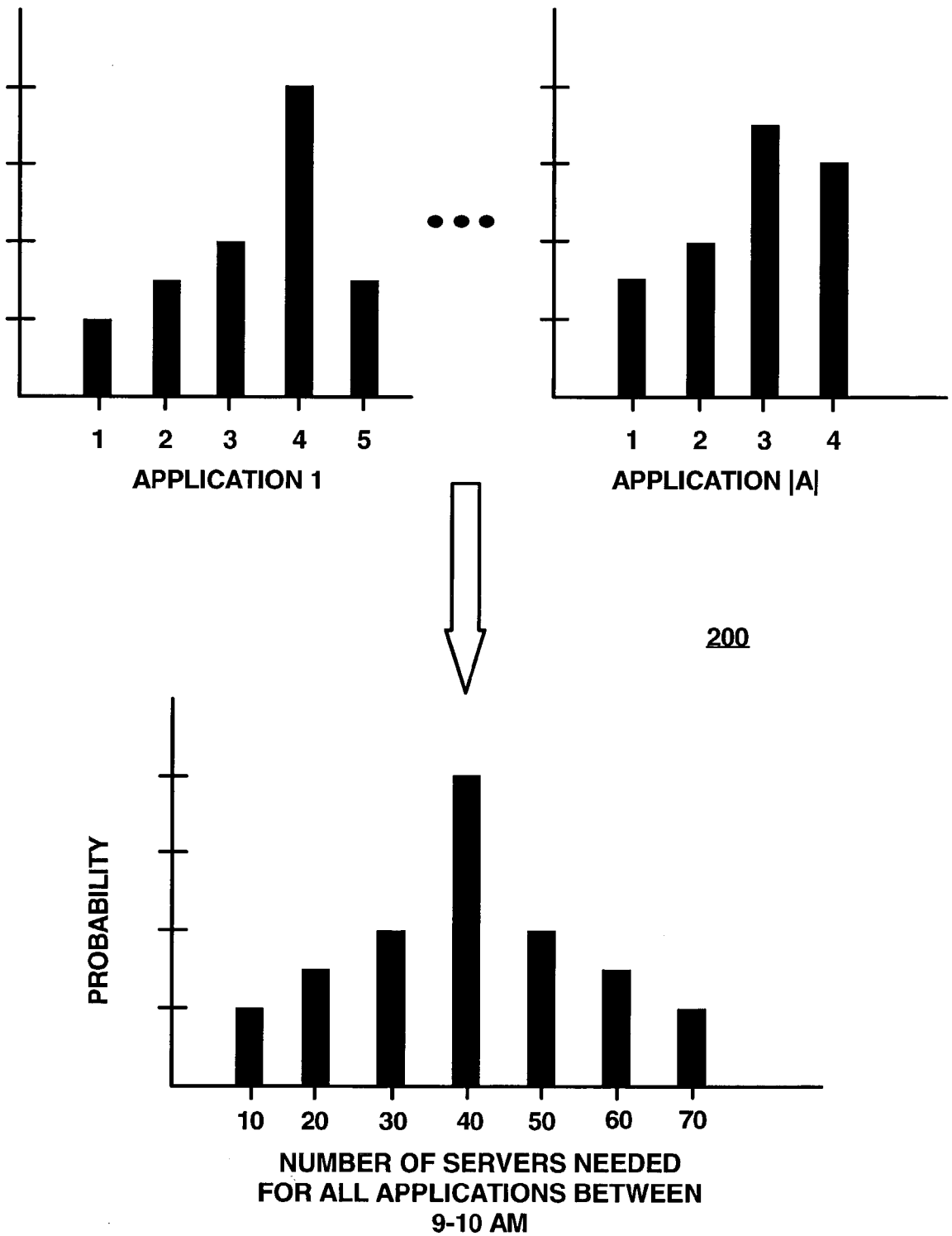
FIG. 2 is a diagram illustrating a construction of a utility (or aggregate) statistical demand profile according to an embodiment of the present invention.

FIG. 2 is a diagram 200 illustrating a construction of a resource utility (or aggregate demand) profile for a particular time slot according to an embodiment of the present invention. As mentioned above, the utility profile thus generated for all time slots may be used to form a calendar. In this example, it is assumed that $A=\{1, 2, \ldots, |A|\}$ denote the set of indices for applications that require resources of the same type from the resource utility, where $|A|$ is the cardinality of the set A. Then, at any particular time slot t, the number of resources needed by the resource utility is the sum of the number of resources needed by each of the applications in A. Thus, if $X_t^a$ represents the random variable for the number of resources needed by application a in time slot t, then $Y_t$ may be represented as follows:

$$Y_t = \sum_{a=1}^{|A|} X_t^a, \quad t=1, 2, \ldots, T \tag{1}$$

Based on this relationship, assuming that application demands are independent of each other, the utility profile may be determined by computing a joint pmf of application demands directly or by using the Central Limit Theorem ("CLT"). The CLT essentially states that the sum of many independent random variables with finite variances tends to have a Normal distribution. Therefore, when the number of applications is large and their individual demands are independent of each other, the aggregate demand $Y_t$ for each time slot t may be characterized by its mean and variance, $u_t$ and $\sigma_t^2$. The mean and the variance may be estimated in the following manner.

Suppose the demand of application a for time slot t, $X_t^a$, has a mean $u_t^a$ and variance $(\sigma_t^a)^2$, which can be derived from the application's pmf. Then the mean and variance of the aggregate demand for slot t, $Y_t$, may be computed as follows:

$$u_t = \sum_a u_t^a, \quad \sigma_t^2 = \sum_a (\sigma_t^a)^2 \tag{2}$$

In this instance, the distribution of $Y_t$ may be approximated by a continuous distribution as follows:

$$P_r[Y_t \leq k] = \int_{-\infty}^{k} \rho_t(x), \text{ where } \rho_t(x) = \frac{1}{\sqrt{2\pi\sigma_t^2}} e^{-\frac{(x-u_t)^2}{2\sigma_t^2}} \tag{3}$$

However, the above approach does not take into account the correlations that may exist between two or more applications. When the demands of individual applications are correlated, the aggregate demand may still be approximated as a Normal distribution, but the quality of the approximation suffers due to the deviation of the real distribution from the Normal distribution. In addition, variance of the aggregate demand $Y_t$ needs to be revised as follows:

$$\sigma_t^2 = \sum_a (\sigma_t^a)^2 + 2\sum_{a<b} Cov(X_t^a, X_t^b) = \sum_a (\sigma_t^a)^2 + 2\sum_{a<b} \rho_t^{ab} \sigma_t^a \sigma_t^b \tag{4}$$

where $Cov(X_t^a, X_t^b)$ represents the covariance between the demand of application a, $X_t^a$ and the demand of application b, $X_t^b$ in time slot t; and $\rho_t^{ab}$ represents the corresponding correlation coefficient. For any given pair of applications, the correlation coefficient $\rho_t^{ab}$ may not be computed solely from the pmfs in the SDPs. Instead, its evaluation may require access to the raw observations for $X_t^a$ and $X_t^b$, which is typically not available to the resource utility when an admission control decision is made. However, the correlations may be estimated and bounded.

According to an embodiment of the present invention, a correlation bounding technique may be utilized. According to equation (4), the variance of the aggregate demand will increase as the correlation between each pair of application increases. The correlation bounding technique may be used to find the highest possible correlation between two discrete random variables with known marginal distributions. In effect, a linear programming problem is solved on the joint pmf using the marginal pmfs as constraints with maximization of the covariance as the objective. Solving the linear programming problem allows the exact upper bound on $\rho_t^{ab}$, $\hat\rho_t^{ab}$ to be computed for any pair of $X_t^a$ and $X_t^b$ in each time slot t. Then an upper bound on $\sigma_t$, $\hat\sigma_t$ may be computed as follows:

$$\hat\sigma_t^2 = \sum_a (\sigma_t^a)^2 + 2\sum_{a<b} \hat\rho_t^{ab} \sigma_t^a \sigma_t^b \qquad (5)$$

Equation (5) provides an estimate of variability of the aggregate demand in the worst case.

In practice, it is unlikely that every pair of applications is correlated to the maximum extent possible. Thus, admission decision solely based on correlation bounding will likely be pessimistic. In an embodiment of the present invention, a measurement bounding technique may be utilized to estimate and bound the correlation between applications. Under this approach, pairwise application correlations for applications executing within the resource utility may be monitored and a single parameter $\rho_t$ may be computed that captures the impact of correlations on $\sigma_t$. The parameter $\rho_t$ may be computed using raw observations of application demands as follows:

$$\rho_t = \frac{\sum_{a<b} Cov(X_t^a, X_t^b)}{\sum_{a<b} \sigma_t^a \sigma_t^b} \qquad (6)$$

Note that $\rho_t$ expresses the magnitude of the aggregate correlation as it impacts the aggregate demand. By substitution, equation (4) may be rewritten as follows with all pairs applications to have $p_t$ as the correlation coefficient:

$$\sigma_t^2 = \sum_a (\sigma_t^a)^2 + 2\rho_t \sum_{a<b} \sigma_t^a \sigma_t^b \qquad (7)$$

If $\rho_{max}$ represents the maximum of $\rho_t$ over all time slots t, then $\rho_{max}$ may used as a calibration factor for the impact of correlations on the aggregate demand.

In an embodiment of the present invention, a combination of the above approaches may be used. For example, when an application is newly introduced, correlations between the newly introduced application and the applications already within the resource utility may be estimated using the pessimistic correlation bounding approach. But as the new application executes, its correlation with other applications may be observed and measured and gradually used to replace the pessimistic bound. The switch over from correlation to measurement bounding may take place after a pre-determined period of time or a pre-determined number of observations or a combination of both.

In a similar manner, SDPs of applications in general may be updated as their behaviors are observed. Also, the SDPs may be updated based on a pre-determined amount of past behavior observations. For example, an SDP of an application may be computed based on some or all of the most recent 100 observations or based on some or all behaviors observed over the most recent three months. One reason for such a cutoff may be due to the limitation of space to store the SDP information. Another reason may be due to the dynamic nature of the application and/or the resource utility. For example, as a particular entity grows or shrinks, the demand for certain applications may correspondingly change over time. Thus, an SDP based on a limited amount of past behaviors may actually be a better predictor of future behavior than an SDP determined from all behaviors since the application was first characterized or admitted.

The utility profile enables statistical assurances to be provided to applications so that they have a high probability of receiving the required resource when needed. For example, in any time slot t, the number of resources of a particular type may be defined as $\Gamma_t$. Then the statistical assurance $\theta$ may be defined to be the expected probability that a resource of the particular type will be available to an application when needed such that:

$$\theta(\Gamma_t) = E\left[\min\left(\frac{\Gamma_t}{\hat Y_t}, 1\right)\right] \qquad (8)$$

where $\hat Y_t = \min(Y_t, M_t)$ and $M_t$ is the peak demand of $Y_t$ computed as the sum of peak demands of individual applications.

The explanation is as follows. Recall that $Y_t$ represents the aggregate demand on a resource by all the applications. If $Y_t > \Gamma_t$, then among the $Y_t$ resources that are needed, only $\Gamma_t$, of them can be served by the resource utility. Thus, the satisfaction rate will be $$\frac{\Gamma_t}{Y_t}.$$

On the other hand, If $Y_t < \Gamma_t$, then the satisfaction rate will be 100%. Note that $Y_t$ is cut off at $M_t$ because the aggregate demand should not exceed $M_t$ based on the pmfs in the application SDPs.

Using the CLT approach, for any given value of $\Gamma_t$, $\theta$ maybe computed as follows:

$$\theta(\Gamma_t) = \int_{-\infty}^{\Gamma_t} p_t(x)dx + \int_{\Gamma_t}^{M_t} \frac{\Gamma_t}{x} p_t(x)dx + \int_{M_t}^{\infty} p_t(x)dx \qquad (9)$$

where $$p_t(x) = \frac{1}{\sqrt{2\pi\sigma_t^2}} e^{\frac{(x-u_t)^2}{2\sigma_t^2}}$$

(see equation (3)).

Conversely, given any desired value for $\theta$, the corresponding required number of resources $\Gamma_t$ for each time slot t may be determined. For example, if $\Gamma_{max} = \max_t (\Gamma_t)$, then a targeted assurance level $\theta$ can be achieved at all times by including $\Gamma_{max}$ resources in the resource utility.

Figure 3:
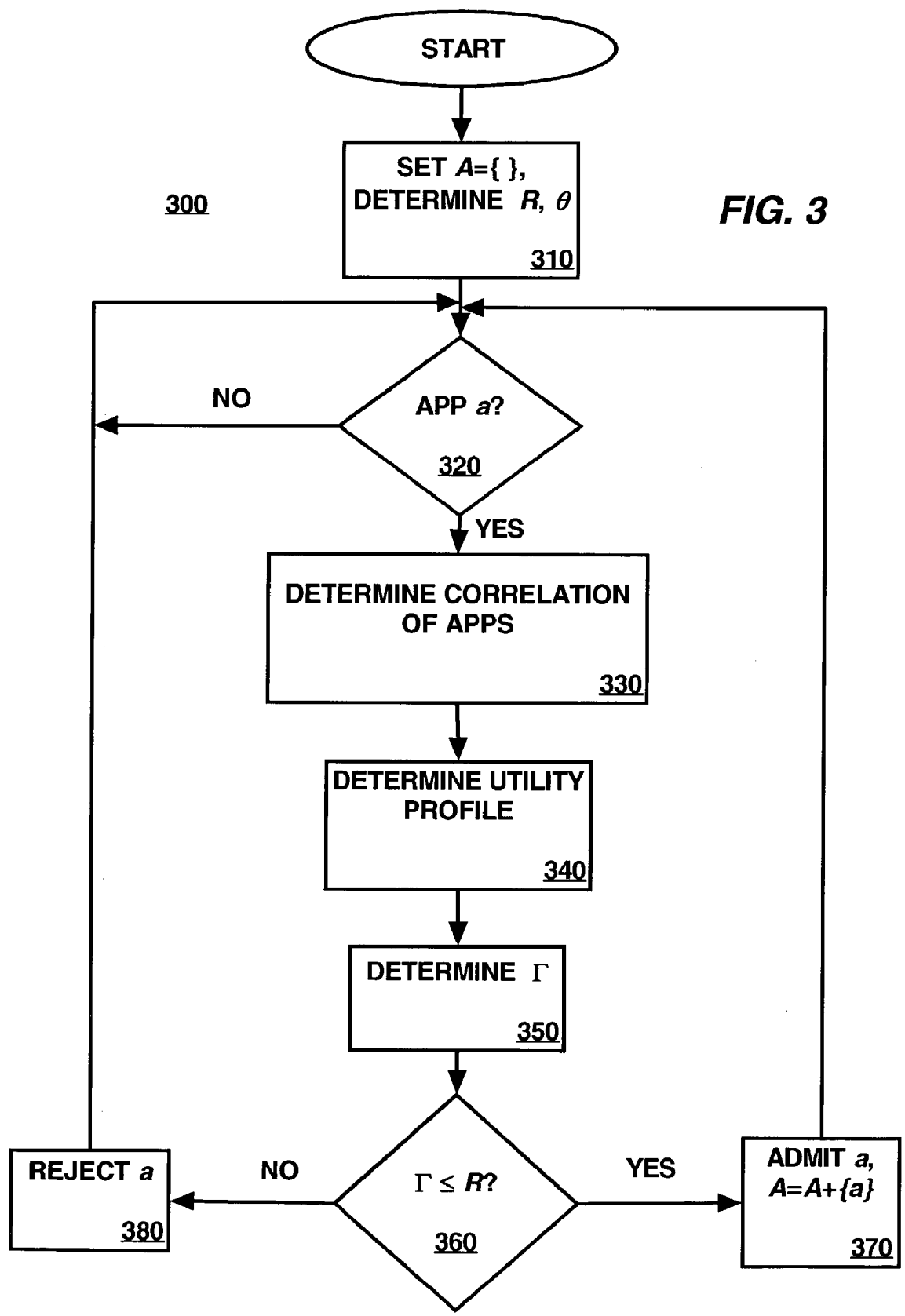
FIG. 3 is a flow diagram illustrating an exemplary method of admission control for applications in a resource utility environment according to an embodiment of the present invention.

FIG. 3 is a flow diagram of a method 300 illustrating an exemplary method of admission control for applications in a resource utility environment. As shown, the method 300 may initialize the currently hosted set of applications (set A) to an empty set and determine the number of allocated resources R and the assurance target level θ for the resource utility (step 310). For example, R and θ may be read from storage or provided through an external source such as from an administrator or from other applications.

Then the method 300 may proceed by determining if there is an application a (step 320) requesting admission to the resource utility. If there is no application a, then the method 300 may simply go back to step 320 and wait for other applications to request admission. If there is an application a requesting admission, then in step 330, the method 300 may proceed to determine correlations among all applications in set A and the application a.

The method 300 may proceed to determine the resource utility (or aggregate demand) profile for the resource utility (step 340). As noted above, the utility profile may be determined based on the SDPs of the application a and the application in set A as well as the correlation factors among the same applications. For example, the SDPs may simply be read from storage or provided through an external source. Similarly, the correlation information may also be read from storage or provided through an external source. However, if the application a is unknown, then the worst case may be assumed and dealt with. For example, the correlation bounding approach—described earlier—may be utilized to compute the upper bounds on the correlation between application a and the applications in set A. As the application a's behavior is observed, measurement bounding approach—also described earlier—may be utilized.

Based on the utility profile, the method 300 may determine the required aggregate resources Γ to meet the target assurance level θ (step 350) and whether the number of allocated resources R is sufficient to meet the required aggregate resources Γ (step 360). If so, then the application a may be admitted and the set of applications A may be updated to include the application a (step 370). If the number of allocated resources R is not sufficient to meet the required aggregate resources Γ, then the application a may be rejected for admission (step 380).

Admitting the application a may actually result in overbooking resources of a particular type. In other words, when measured relative to peak resource requirements of the currently hosted applications, the number of allocated resources R will be less than the sum of the peak demands of the currently hosted applications including application a. However, as indicated above, the number of allocated resources R is sufficient to meet the target assurance level θ.

Note that the method 300 may easily be modified to include steps to update the SDPs of applications. As an alternative, a separate process may be implemented to update the SDPs of applications apart from the method 300.

Figure 4:
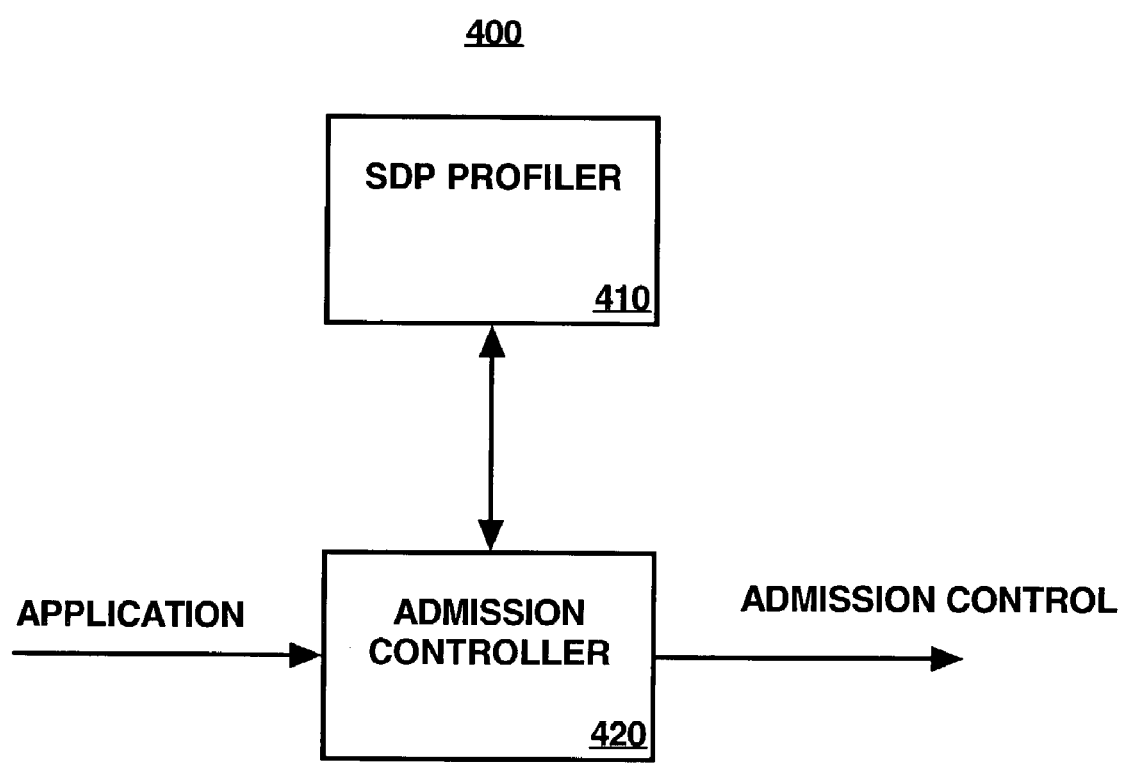
FIG. 4 is a block diagram illustrating an exemplary admission control system according to an embodiment of the present invention.

FIG. 4 is a block diagram illustrating an exemplary admission control system 400. As shown, the system 400 may include an SDP profiler 410 and an admission controller 420. The SDP profiler 410 may be configured to determine statistical demand profiles of applications, determine resource demands of applications, as well as to periodically update the SDPs of the applications. Examples of specific details to determine SDPs and resource demands as well as to update SDPs have been described above and are not repeated here.

When determining the resource demands of applications, the profiler 410 may do so over cycles of repeatable behaviors. A cycle may be viewed as a period of time where behavior of the application is expected to be repeated. A cycle may be any length of time such as a day, a week, a month, etc., and may be specified by an external entity other than the profiler 410.

The admission controller 420 may be configured to admit an application to the resource utility based on the SDP of the application, the assurance level of the resource utility, and the SDPs of the currently hosted applications. As indicated above, applications may be admitted if the resources available in the resource utility is sufficient to meet the assurance level of the resource utility, even if it may result in overbooking of the resources. As part of the admitting process, the admission controller 420 may be configured to determine correlation factors among applications, for example by using the correlation bounding, the measurement bounding, or a combination of both.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files.

Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general. While the invention has been described with reference to the exemplary embodiments thereof, it is to be understood that various modifications may be made to the described embodiments of the invention without departing from the spirit and scope of the invention. The terms and descriptions used herein are set forth by way of illustration only and are not meant as limitations. In particular, although the methods of the present invention has been described by examples, the steps of the method may be performed in a different order than illustrated or may be performed simultaneously. These and other variations are possible within the spirit and scope of the invention as defined in the following claims and their equivalents.

The invention claimed is:

1. A method of admission control for an application in a resource utility environment, the method comprising:
    determining the application's statistical demand profile for resources required by the application, by determining resource demands of the application over cycles of repeatable behavior;
    determining a target assurance level of the resource utility based upon the application's statistical demand profile, wherein the target assurance level comprises a desired level of probability that a requested resource will be made available to perform the application;
    determining the number of resources required to meet the target assurance level;

determining whether there are sufficient aggregate resources to meet the target assurance level for the application based upon one or more applications currently hosted by the resource utility; and admitting the application in response to a determination that the number of aggregate resources is sufficient to meet the target assurance level.

2. The method of claim 1, wherein the step of admitting of the application results in overbooking one or more pools of resources requested by the application such that a sum of allocated resources in the one or more pools of resources is less than a sum of peak demands for resources in the one or more pools of resources.

3. The method of claim 2, further comprising determining a correlation factor between the application and the one or more currently hosted applications, wherein the step of admitting the application is also based on the correlation factor between the application and the one or more currently hosted applications.

4. The method of claim 3, wherein the correlation factor is estimated by using at least one of a correlation bounding and a measurement bounding.

5. The method of claim 4, wherein the correlation bounding is used for a newly introduced application.

6. The method of claim 5, wherein the measurement bounding is used for the newly introduced application as behaviors of the newly introduced application are observed over at least one of a pre-determined period of time and a pre-determined number of observations.

7. The method of claim 2, further comprising updating the statistical demand profile of the application as behaviors of the application are observed.

8. The method of claim 7, wherein the step of updating the statistical demand profile for the application comprises using a predetermined amount of past behavior observations.

9. The method of claim 1, wherein the step of determining the resource demands of the application comprises:

modeling a number of required resources of a particular type as a sequence of random variables $\{X.sub.t, t=1, 2, 3, \ldots, T\}$, wherein t indicates a particular time slot, T indicates a total number of time slots, and $X.sub.t$ indicates the required number of resources of the particular type during each time slot; and determining a set of sequences of probability mass functions, wherein each sequence is for the particular type.

10. The method of claim 9, wherein the each probability mass function is a set of probabilities $\{p_k, k=1, 2, 3, \ldots m\}$, wherein $p_k = P_r[X_{t=k}]$.

11. The method of claim 10, wherein at least one probability mass function is estimated through observations such that a corresponding estimated probability mass function is $\{\hat{p}_k=1, 2, 3, \ldots m\}$, $$\hat{p}_k = \frac{Z_k}{N},$$

wherein N is a number of observations and $Z_k$ is a number of observations with a value of k.

12. An admission control system for admitting an application in a resource utility environment, comprising:

a statistical demand profile configured to determined a statistical demand profile of the application, wherein determining resource demands of the application over cycles of repeatable behavior;

an admission controller configured to determine a target assurance level of the resource utility based upon the statistical demand profile of the application, wherein the target assurance level comprises a desired level of probability that a requested resource will be made available to perform the application, said admission controller being further configured to determined the number of resources required to meet the target assurance level, and to determine whether there are sufficient aggregate resources to meet the target assurance level for the application based upon statistical demand profiles of one or more applications currently hosted by the resource utility, and wherein the admission controller is further configured to admit the application in response to a determination that the number of aggregate resources is sufficient to meet the target assurance level.

13. The system of claim 12, wherein the admission controller is configured to overbook one or more resource pools requested by the application such that a sum of allocated resources in the one or more pools of resources is less than a sum of peak demands for resources in the one or more pools of resources.

14. The system of claim 13, wherein the admission controller is configured to:

determine a correlation factor between the application and the one or more currently hosted applications; and admit the application based on the correlation factor between the application and the one or more currently hosted applications.

15. The system of claim 14, wherein the admission controller is configured to estimate the correlation factor using at least one of a correlation bounding and a measurement bounding.

16. The system of claim 15, wherein the admission controller is configured to use correlation bounding for a newly introduced application.

17. The system of claim 16, wherein the admission controller is configured to use the measurement bounding for the newly introduced application as a behavior the new introduced application is observed over at least one of a pre-determined period of time and a pre-determined number of observations.

18. The system of claim 13, wherein the statistical demand profiler is configured to update the statistical demand profile of the application as behaviors of the application are observed.

19. The system of claim 18, wherein the statistical demand profiler is configured to update the statistical demand profile for the application using a predetermined amount of past behavior observations.

20. The system of claim 12, wherein the statistical demand profiler is configured to determine resource demands of the application by:

modeling a number of required resources of a particular type as a sequence of random variables $\{X.sub.t, t=1, 2, 3, \ldots, T\}$, wherein t indicates a particular time slot, T indicates a total number of time slots, and $X.sub.t$ indicates the required number of resources of the particular type during each time slot; and determining a set of sequences of probability mass functions, wherein each sequence is for the particular type and each probability mass function is a set of probabilities $\{p.sub.k, k=1, 2, 3 \ldots, m\}$ wherein $p.sub.k = P.sub.r[X.sub.t=k]$.

21. The system of claim 20, wherein the statistical demand profiler is configured to estimate at least one probability mass function through observations such that a corresponding estimated probability mass function is $\{\hat{p}_k, k=1, 2, 3, \ldots m\}$, $$\hat{p}_k = \frac{Z_k}{N},$$

wherein N is a number of observations and $Z_k$ is a number of observations with a value of k.

22. A computer readable medium on which is embedded computer software comprising a set of instructions for a method of admission control for an application in a resource utility environment, the method comprising:

determining the application's statistical demand profile for resources required by the application, by determining resource demands of the application over cycles of repeatable behavior;

determining a target assurance level of the resource utility based upon the application's statistical demand profile, wherein the target assurance level comprises a desired level of probability that a requested resource will be made available to perform the application;

determining the number of resources required to meet the target assurance level;

determining whether there are sufficient aggregate resources to meet the target assurance level for the application based upon one or more applications currently hosted by the resource utility; and admitting the application in response to a determination that the number of aggregate resources is sufficient to meet the target assurance level.

23. The computer readable medium of claim 22, wherein the step of admitting of the application results in overbooking one or more resource pools requested by the application such that a sum of allocated resources in to one or more pools of resources is less than a sum of peak demands for resources in the one or more pools of resources.

24. The computer readable medium of claim 23, further comprising determining a correlation factor between the application and the one or more currently hosted applications, wherein the step of admitting the application is also based on the correlation factor between the application and the one or more currently hosted applications.

* * * * *

UNITED STATES PATENT AND TRADEMARK OFFICE
CERTIFICATE OF CORRECTION

PATENT NO. : 7,188,174 B2 Page 1 of 1
APPLICATION NO. : 10/330312
DATED : March 6, 2007
INVENTOR(S) : Jerome Alexander Rolia et al.

It is certified that error appears in the above-identified patent and that said Letters Patent is hereby corrected as shown below:

In column 11, line 11, in Claim 2, delete "allocatod" and insert -- allocated --, therefor.

In column 11, line 14, in Claim 3, delete "Thc" and insert -- The --, therefor.

In column 11, line 15, in Claim 3, delete "thc" and insert -- the --, therefor.

In column 11, line 49, in Claim 10, delete "$p_k=P_r[X_{t=k]}$" and insert -- $P_k=P_r[X_t=k]$ --, therefor.

In column 11, line 53, in Claim 11, delete "$\{\hat{p}_k=1, 2, 3, \ldots m\}$" and insert -- $\{\hat{p}_k, k=1, 2, 3, \ldots m\}$ --, therefor.

In column 11, line 60, in Claim 11, after "$Z_k$" delete -- , --.

In column 14, line 15, in Claim 23, delete "to" and insert -- the --, therefor.

Signed and Sealed this

Sixteenth Day of December, 2008

JON W. DUDAS
*Director of the United States Patent and Trademark Office*